United States Patent [19]
Clayton et al.

[11] Patent Number: 5,328,540
[45] Date of Patent: Jul. 12, 1994

[54] MECHANIZED LAY UP ASSEMBLY LINE FOR COMPOSITE STRUCTURES

[75] Inventors: Colin G. Clayton, torrance; Frank R. Chang, Cerritos, both of Calif.

[73] Assignee: Northrop Corporation, Los Angeles, Calif.

[21] Appl. No.: 847,518

[22] Filed: Mar. 6, 1992

[51] Int. Cl.$^5$ .............................................. B29C 65/00
[52] U.S. Cl. .................................. 156/285; 156/286; 156/382; 156/556; 156/563; 193/35 SS
[58] Field of Search .................... 193/35 SS; 156/285, 156/286, 382, 556, 563

[56] References Cited

U.S. PATENT DOCUMENTS

| | | | |
|---|---|---|---|
| 4,036,345 | 7/1977 | Webb | 193/35 SS |
| 4,133,711 | 1/1979 | August et al. | 156/362 |
| 4,347,794 | 9/1982 | Nordström | 193/35 SS |
| 4,627,526 | 12/1986 | Masciarelli | 193/35 SS |
| 4,700,474 | 10/1987 | Choinski | 156/382 |
| 4,706,793 | 11/1987 | Masciarelli | 193/35 SS |
| 4,819,554 | 4/1989 | Fleischer et al. | 193/35 SS |
| 4,869,770 | 9/1989 | Christensen et al. | |
| 4,886,442 | 12/1989 | McCowin et al. | 156/382 |
| 4,900,379 | 2/1990 | Chapman | |
| 4,944,824 | 7/1990 | Gupta | |
| 4,963,215 | 10/1990 | Ayers | 156/286 |
| 5,008,520 | 4/1991 | Georgiou et al. | |
| 5,116,216 | 5/1992 | Cochran et al. | 156/382 |

*Primary Examiner*—Jay H. Woo
*Assistant Examiner*—William J. Matney, Jr.
*Attorney, Agent, or Firm*—Terry J. Anderson; Robert B. Block; Karl J. Hoch, Jr.

[57] ABSTRACT

A mechanized lay up assembly line for composite structures has a tool delivery station having a plurality of rollers on its surface for moving tools across the surface. Adjacent to the tool delivery station is a work station. The work station includes a work surface. The work surface has a plurality of rollers that move from a position wherein the rollers extend above the work surface to support a tool above the work surface to a retracted position where the rollers descend below the work surface such that the tool is supported on the work surface. The mechanized lay up assembly line further includes a debulking diaphragm that moves toward and away from the work surface and a vacuum system for evacuating the space between the diaphragm and the work surface. Tools are moved from the delivery station to the work station with the work station rollers extended. When a tool is positioned on the work station its rollers are retracted to position the tool firmly on the working surface. A composite structure is laid up on the tool supported on the work surface. Debulking and compacting of the composite material is accomplished by vacuum sealing the diaphragm against the composite material on the tool and the working surface.

23 Claims, 3 Drawing Sheets

MECHANIZED LAY UP ASSEMBLY LINE FOR COMPOSITE STRUCTURES

BACKGROUND OF THE INVENTION

This invention is directed to a mechanized lay up assembly line utilized for lay up and debulking of composite materials on lay up tools.

Because of high strength coupled with light weight, composite parts are being increasingly used as structural components in a variety of articles including air craft. Typical composite part materials include glass or graphite fibers that are embedded in resins such as epoxy, phenolic or bismaleimide resins. Generally the fiber and resin is "laid up" over a die or mold and then is cured under elevated temperature and pressure.

Composite parts destined to be used in air craft must meet exacting requirements as to their structural integrity. To meet these exacting requirements, precise control of lay up, debulking, and cure is required.

A widely utilized system for forming composite structural parts uses materials that are identified as "prepregs". These are sheets of fiber that have uncured resin embedded therein. The prepreg is positioned in a forming die or tool and is then subjected to heat and pressure to cure the prepreg into the composite material. A prepreg may be initially formed into a composite structure directly in the forming tool or it may be laid up on an additional tool identified as a lay up tool and then later transferred to the forming tool.

Certain patents are known that will assist the artisan in forming composite structures. These include U.S. Pat. No. 4,944,824 that generally reviews the physical steps that occur during prepreg cure. They further include U.S. Pat. No. 4,963,215 that discloses a method for debulking pre-cured thermal plastic composite laminae. Additionally, they include U.S. Pat. No. 4,869,770 that discloses a method of preventing buckling of thermal plastic composite laminates during cure; U.S. Pat. No. 4,900,379 that discloses a method of assisting lay up of layers of prepreg by printing patterns with an ink jet on the prepreg layers; and finally, U.S. Pat. No. 4,133,711 that discloses a mechanized apparatus for cutting, moving and stacking prepreg materials prior to lay up of these materials on a tool.

The tools utilized for prepreg lay up and cure must meet exacting standards as to dimensions and stability. This normally requires that these tools be of a sufficient size to maintain dimensional stability and be of a material having a low thermal expansion or a controlled thermal expansion. Typical of such tools are aluminum alloy metallic tools and bulk graphite tools. By their very nature such tools are heavy and are usually of such a size as to preclude direct manipulation of the tool by a human without some sort of mechanical assistance.

To form a composite part, various plies of prepreg are individually draped over or into the lay up tool by a technician. This lay up is facilitated by raising the temperature of the prepreg to soften it and make it more pliable. Such heating can be accomplished by the use of heat guns, infrared lamps, or by heating the tool itself. The plies are generally smoothed on one another to avoid wrinkles and to achieve the desirable ply orientation. Prior to subjecting the prepreg material to a heat and pressurization cure cycle, the plies are generally debulked or consolidated. Such debulking or consolidation insures that the plies assume the shape of the lay up tool and removes air bubbles or other voids between individual ply layers. It is often desirable to debulk and consolidate several times during the lay up of the plies, especially if a large number of plies are utilized for a composite part.

As heretofore practiced, a lay up tool would be moved by mechanical means, as for instance forklifts, gantries or other mechanical assisting devices to a position wherein a lay up technician could gain access to the tool. The technician then applies a number of plies of prepreg to the tool. If consolidation is required between application of plies a consolidation diaphragm needs to be applied over the tool and a vacuum introduced between the tool and the diaphragm. Once consolidation is complete, the lay up technician can then proceed to complete the lay up of additional plies. Lay up technicians are humans of different statures. Thus because the lay up technicians come in different sizes and temperaments, tooling positioning that is optimally placed for one technician may not be optimally placed for a further technician.

BRIEF DESCRIPTION OF THE INVENTION

In view of the above it is evident that there has been long felt need for more efficient means to assist in tool manipulation during composite part lay up and debulking. It is therefore a broad object of this invention to provide for a mechanized lay up assembly line for forming composite structure. It is a further object to provide apparatus that allows for ease of tool movement by an operator yet also provides for tool stability during lay up of composite parts.

In accordance with this invention there is provided a mechanized lay up assembly line for handling composite materials that includes a tool delivery station and a work station. The tool delivery station includes a roller means for moving tools from one point to the other on the delivery station. The work station includes a working surface for supporting a tool. The working surface includes a retractable roller means for assisting in moving tools from one point to another point on the working surface. The retractable roller means is mounted with respect to the working surface so as to move with respect to that surface between first and second positions wherein in the first position at least a portion of the roller means extends above the plane of the working surface for supporting and moving tools over the working surface and in the second position the roller means is retracted below the plane of the working surface allowing tools to contact the working surface.

The mechanized lay up assembly line can further include at least one tool dispatch station also located immediately adjacent the work station. The tool dispatch station also includes roller means for moving tools from one point to the other point on the dispatch station. In a preferred embodiment, the apices of the delivery station roller means would be located in a moving plane with this same moving plane also being positioned at the apices of the roller means of the tool dispatch station. Further, when the roller means of the work station are in their first or elevated position, the apices of these roller means would also be located in the same moving plane allowing for ease of tool movement from the tool delivery station to the work station and from the tool work station to the tool dispatch station.

In a preferred embodiment of the invention the invention further includes a debulking means operatively associated with the work station working surface. The debulking means is for debulking composite materials on tools. In an embodiment of the invention the debulking means includes a frame means, a diaphragm means and a pressure differential means. The diaphragm means is supported in the frame means. The pressure differential means is for creating a pressure differential across the diaphragm means. The diaphragm means includes a seal means for sealing the diaphragm means to the working surface and the pressure differential means includes a vacuum means for creating a vacuum between the working surface and the diaphragm means when the diaphragm is sealed to the working surface.

In a preferred embodiment of the invention the vacuum means includes a vacuum reservoir means for isolating a volume of space at a low pressure. It further includes a fluid passageway means for connecting the vacuum reservoir to the area between the working surface and the diaphragm means when the diaphragm means is sealed to the working surface. Additionally, a heating means can be operatively associated with the working surface for heating the working surface. The heating means allows for maintaining a tool in an elevated heated state by conduction of heat from the working surface to the tool.

In a preferred embodiment of the invention the roller means includes a retracting and lifting means. The retracting and lifting means is for moving the roller means between elevated and recessed positions. The retracting and lifting means can include a bladder means. The bladder means is capable of expanding when filled with fluid and is in operative association with the roller means for moving the roller means from a recessed position to an elevated position with respect to the working surface. Further, the retracting and lifting means can include a spring means for biasing the roller means back to a recessed position.

In a preferred embodiment of the invention a plurality of openings are located in the working surface with the roller means comprising a plurality of rollers each individually mounted in one of the openings in the working surface. At least one chamber is sealed to the under side of the surface and surrounds the openings in the surface. An inflatable bladder is located in the chamber between the chamber and the rollers and is connected to a means for inflating and deflating the bladder with a working fluid.

Further, in accordance with this invention there is provided a process of conveying heavy tools that includes selecting a delivery station that has a roller means for moving tools on the delivery station. The process further includes selecting a working station that includes a working surface and a retractable roller means associated with the working surface. The retractable roller means is for moving tools on the working station in an elevated position and further for retracting below the working surface to a retracted position wherein tools are directly supported on the working surface. The tool delivery station is located adjacent to the working station and a tool is located on the delivery station. The working station roller means are moved to an elevated position and the tool is moved from the delivery station to the working station. Once on the working station, the roller means are retracted to locate the tool directly on the working surface.

Further, in accordance with this invention there is provided a process of laying up and debulking composite materials on a tool that includes the steps of selecting a work station to include a working surface and a plurality of rollers associated with the working surface. The steps further include selecting the work station to include a vacuum port in the working surface and a means for generating a vacuum at the vacuum port. A delivery station having rollers is located adjacent to the work station and a frame having a flexible diaphragm is located in association with the work station. A lay up tool is positioned on the delivery station and the work station rollers are elevated such that at least a portion of the rollers extend above the working station surface. The tool is moved from the delivery station rollers to the work station rollers and is positioned at the work station. The work station rollers are then retracted below the plane of the working surface to position the tool directly on the working surface. Next layers of composite material are laid up on the tool and are debulked by moving the frame with respect to the working surface to engage the diaphragm against the composite material on the tool. A vacuum is drawn at the vacuum port to debulk the composite material on the tool followed by release of the vacuum and movement of the frame and diaphragm away from the tool having the composite thereon. The work station rollers are elevated and the tool having the laid up debulked composite material thereon is then moved from the work station.

BRIEF DESCRIPTION OF THE DRAWINGS

This invention will be better understood when taken in conjunction with the drawings wherein.

DETAILED DESCRIPTION OF THE INVENTION

Figure 1:
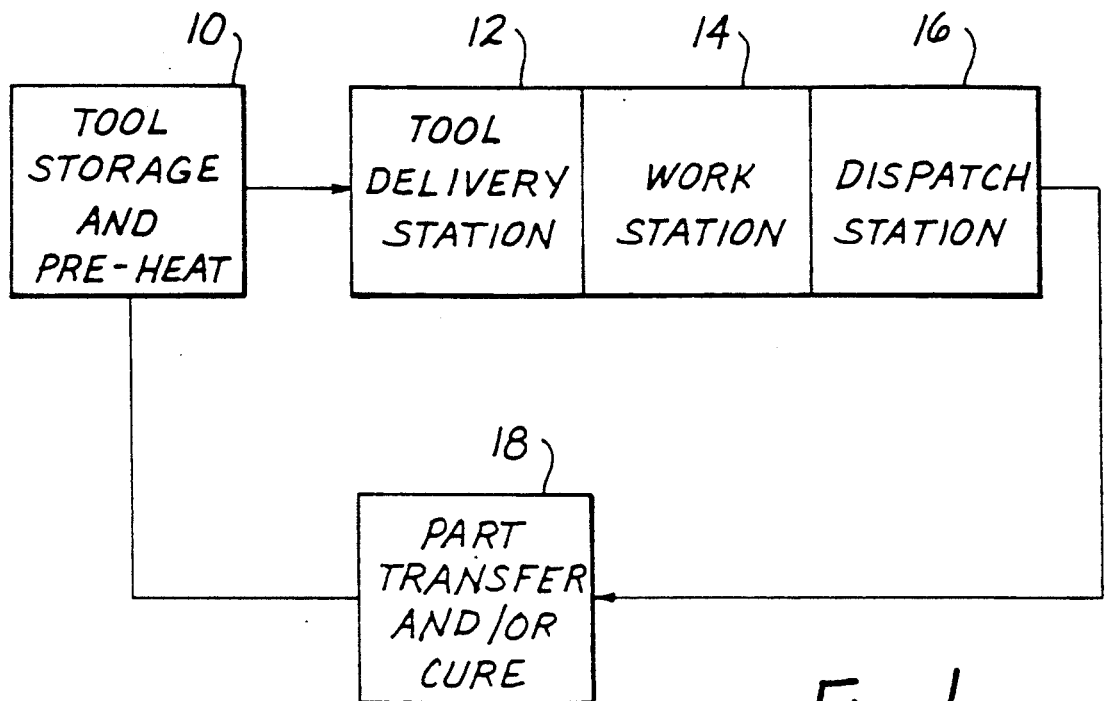
FIG. 1 is a box diagram showing cycling of tools on the mechanized lay up assembly line of the invention.

Illustrated in the flow diagram of FIG. 1 is the movement of a tool as it is progressed along the composite structure mechanized lay up and assembly line of the invention. A tool from a tool storage or preheat station 10 is delivered to a tool delivery station 12. From the tool delivery station 12 the tool is then moved to a tool work station 14. While at the tool work station 14 the various plies of a composite part are assembled on the tool and they are debulked. After assembly and debulking is completed the tool having the composite part plies located thereon is then moved to a dispatch station 16. From the dispatch station the composite part bearing tool is then moved to a part transfer and/or cure station 18. I f a composite structure is to be cured directly in the tool on which it was laid up, curing would be effected at station 18. If the part is to transferred to a further curing tool, this also would occur at the station 18. In any event, after transfer and/or cure and removal of the composite part, the tool is then returned to the tool storage and/or preheat station 10.

Figure 2:
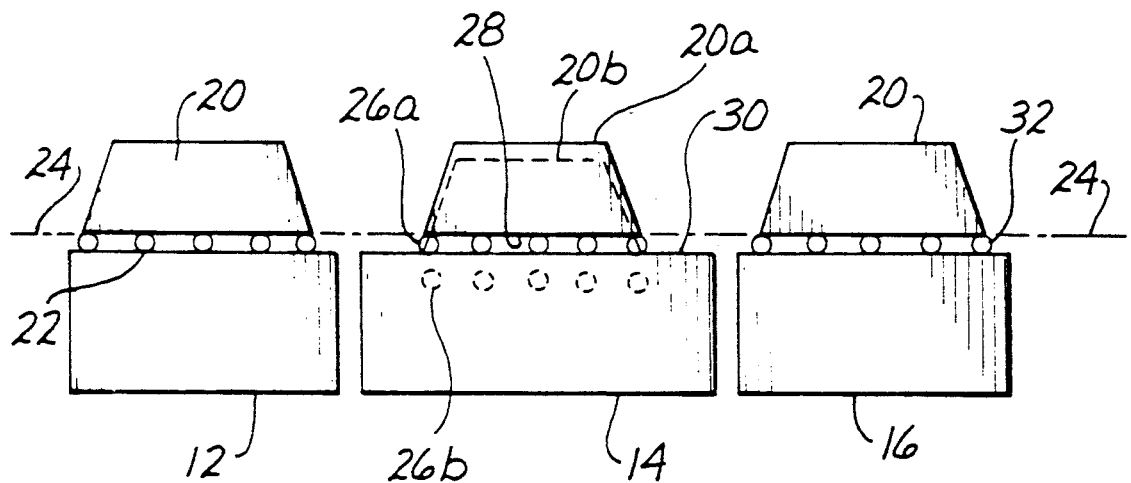
FIG. 2 is a representational diagram showing movement of a tool from a delivery station to a work station, lowering the tool on to the work station, raising the tool on the work station and finally moving the tool to a dispatch station.

Movement of the tool between the tool delivery station 12, the work station 14 and the dispatch station 16 is shown in a diagrammatic way in FIG. 2. In order to coordinate the several view shown in the figures, the same numerals are utilized in FIGS. 2 and 3 for identifying the stations 12, 14 and 16 as were used in FIG. 1. Thus, in FIG. 2 a tool 20 is locate at the tool dispatch station 12. The tool dispatch station includes a plurality of rollers 22, as hereinafter described in greater detail, that support the tool 20 at the tool delivery station 12. At the tool delivery station 12, the bottom of the tool 20 is located and supported in plane, a moving plane, depicted by the phantom line 24.

Adjacent to the tool delivery station 12 is the work station 14. The work station 14 includes a plurality of rollers collectively identified by the number 26. The rollers 26 differ from the rollers 22, however, in that the rollers 26 can move from the position shown in solid line identified by the numeral 26a to the position shown in phantom line identified by the numeral 26b. When the rollers are in the position shown by the solid line 26a, the apex of these rollers also locate the bottom 28 of the tool 20 in the moving plane 24. However, when the rollers 26 move to a retracted position shown by the numeral 26b, the bottom 28 of the tool 20 is moved downward from the moving plane 24 and rests upon a working surface 30 that is part of the work station 14.

In FIG. 2 the numeral 20b is utilized to identify the phantom line representation of the tool 20 when it rests on the work surface 28. When the tool is in the phantom line position, as shown by the numeral 20b, it is firmly seated on the work surface 30 allowing an operator or technician to assemble an appropriate lay up of composite material plies on the tool.

Upon completion of assembly and debulking of these plies on the tool 20b, the rollers 26 are once again elevated from their recessed position 26b to their elevated position 26a. This raises the tool to an elevated position as depicted by the solid line tool 20a on the work station 14. This once again positions the bottom 28 of the tool in the moving plane 24 allowing the tool 20 to then be rolled across the moving plane to rollers collectively identified by the numeral 32 that are located at the dispatch station 16. Since the apex of the rollers 32 are also located in the moving plane 24, the tool 20 is easily moved from the work station 14 to the dispatch station 16. Tool movement between the tool deliver station 12, the work station 14 and the dispatch station 16 is easily effected by simply hand moving the tool by an operator or technician.

In laying up prepreg plies, as for instance a bismaleimide ply, it is generally preferred to drape such plies on a tool that has been preheated to 130° F. ±10°. In order not to "tie up" the work station 14, generally tool preheating can be done, as for instance at a tool storage and preheating station depicted by numeral 10 in FIG. 1. When the tool is transferred to the work station 14, the heated state of the tool is maintained by heating the work surface 30 allowing heat to be conducted from the work surface 30 to the tool. In a preferred embodiment of the invention the work surface 30 is therefore heated in order to maintain the tool at a heated temperature during lay up of the composite plies thereon.

A typical tool, as for instance a 60" by 24" by 4" thick aluminum tool, might weigh upwards of 300 to 500 lbs. Maintaining this heated tool at an elevated temperature can be effected by maintaining the working surface 30 also at an elevated temperature allowing for conduction of heat to the tool. Further, such a tool is easily moved through the moving plane 24 by simple hand movement of an operator because of the ease of movement of the tools on the rollers 22, 26 and 32, respectively, between the tool delivery station 12, the work station 14 and the dispatch station 16.

Figure 3:
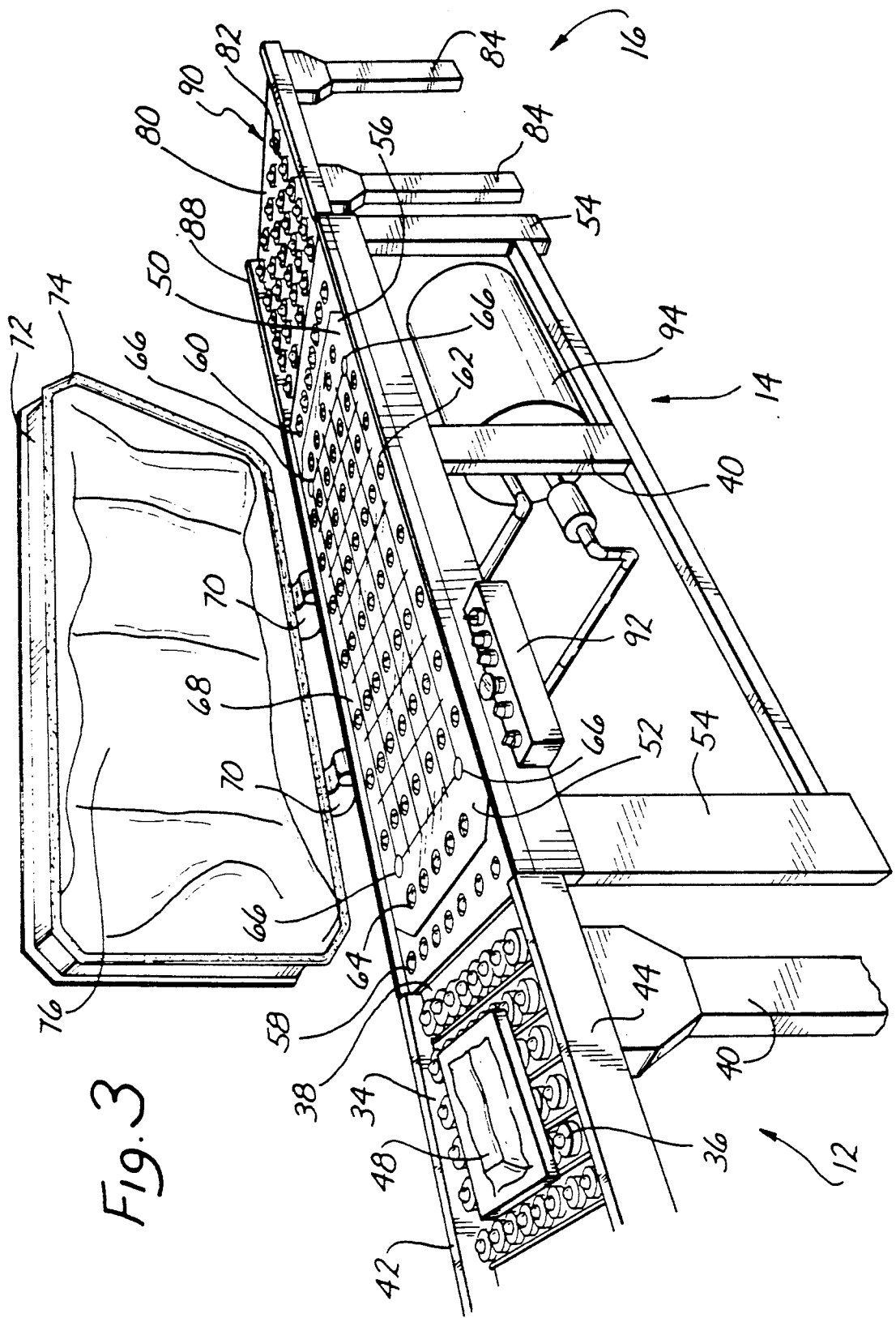
FIG. 3 is an isometric view of the delivery station, work station and dispatch station of the invention.

FIG. 3, shows the details of the tool delivery station, the work station and the dispatch station of the invention. Again for ease of understanding of the various figures of the drawings, the numerals 12, 14 and 16 also will be utilized to identify the delivery station, work station and dispatch station in FIG. 3.

Shown in FIG. 3 at the delivery station 12, is a delivery table 34. The delivery table 34 can be selected as a ball transfer table available from Matthews Conveyor Products. It includes a plurality of caged ball rollers 36 located in a matrix on the table surface 38. Legs 40 (only one of which is shown in the figures) of table 34 are adjustable allowing for alignment of the height of the table surface 38 and the caged ball rollers 36 thereon. Front and back guard rails 42 and 44 are positioned in a parallel arrangement along the sides of the table 34. This allows for entry of a tool at end 46 onto the table 34. Other arrangements could be utilized wherein one or the other of the guard rails 42 or 44 are removed allowing for movement of a tool onto the delivery table 34 from a position other than from the end 46. Shown located on the delivery table 34 is a tool 48.

Shown located adjacent the delivery table 34 at work station 14 is a work table 50. The work table 50 is shown in further detail in FIG. 4. The work table 50 includes a platen 52 that is supported by legs, collectively identified by the numeral 54. The top of the platen 52 forms a work surface 56. Presently preferred for the platen 52 is hard anodized aluminum. Such material is both durable and is a good heat conductor. A fixed row of caged ball rollers 58 is located on the left hand end of the work surface 56 and an identical fixed row of fixed caged ball rollers 60 is located on the other end. The apex of the roller balls in the assemblies 58 and 60 are at the same height as are the caged ball rollers 36 of the delivery table 34.

Other caged ball rollers, however, are positioned with respect to the work surface such that they can be moved to a first or elevated position wherein they project above the work surface 56 or they can be depressed to a second or retracted position wherein they are below the plane of the work surface 56. These caged ball rollers are generally identified by the numeral 62 in FIGS. 3 and 4 and one of them is shown in greater detail in FIG. 5.

The work surface 56 includes a plurality of openings, collectively identified by the numeral 64. Each of the caged ball rollers 62 are located in one of these openings. The caged ball rollers 62 move upwardly and downwardly in these openings as discussed in greater detail below in describing FIG. 5.

Four vacuum ports, collectively identified by the numeral 66, are located in work surface 56. A matrix of inscribed vacuum channels 68 connect between the vacuum port 66 for propagating vacuum across the totality of the work surface 56 as hereinafter explained.

Hinged via hinges 70 to the work table 50 is a diaphragm frame 72. Located around the edge of the diaphragm frame 72 is seal 74. Integral with the seal 74 is a diaphragm 76. When the frame is rotated about the hinges 70, the seal 74 contacts the work surface 56 inboard of the caged ball rollers 58 and 60, but outboard of the caged ball rollers 62. Further, the vacuum port 66 and inscribed vacuum channels 68 are also inboard of the periphery of the seal 74.

In prior art lay up and debulk tooling, generally a seal is positioned directly on the surface of a lay up tool. In using the mechanized lay up assembly line of this invention, seals do not need to be included on tools. Additionally while the seal 74 could be positioned on the work surface 56, it is preferred in this invention to position the seal 74 directly on the diaphragm frame 72 at the edge of the diaphragm 76. This allows for movement of the seal 74 upward and away from the working surface 56 during tool movement onto and off of the working surface 56. Such positioning of the seal 74 removes it out of harms way during tool movement and thus contributes to longer life of the seal 74.

The diaphragm 76 is formed of a rubber material that is flexible yet of sufficient strength to impart debulking and consolidation pressure onto composite material laid up on a tool, as for instance, on tool 48. The diaphragm 76 can be suspended in the diaphragm frame 72 via "bungie" type straps collectively identified by the numeral 78 that suspend the diaphragm 76 in the diaphragm frame 72 but allow for flexure of the diaphragm 76 downwardly onto a tool and composite prepreg plies located on that tool.

To the right of the work station 14 in FIG. 3 is the dispatch station 16. Dispatch station 16 is formed of a dispatch table 80 that can be identical to the delivery table 34. It would include caged ball rollers 82, legs 84, guard rails 86 and 88 and end 90 essentially as described for the delivery table 34.

Figure 4:
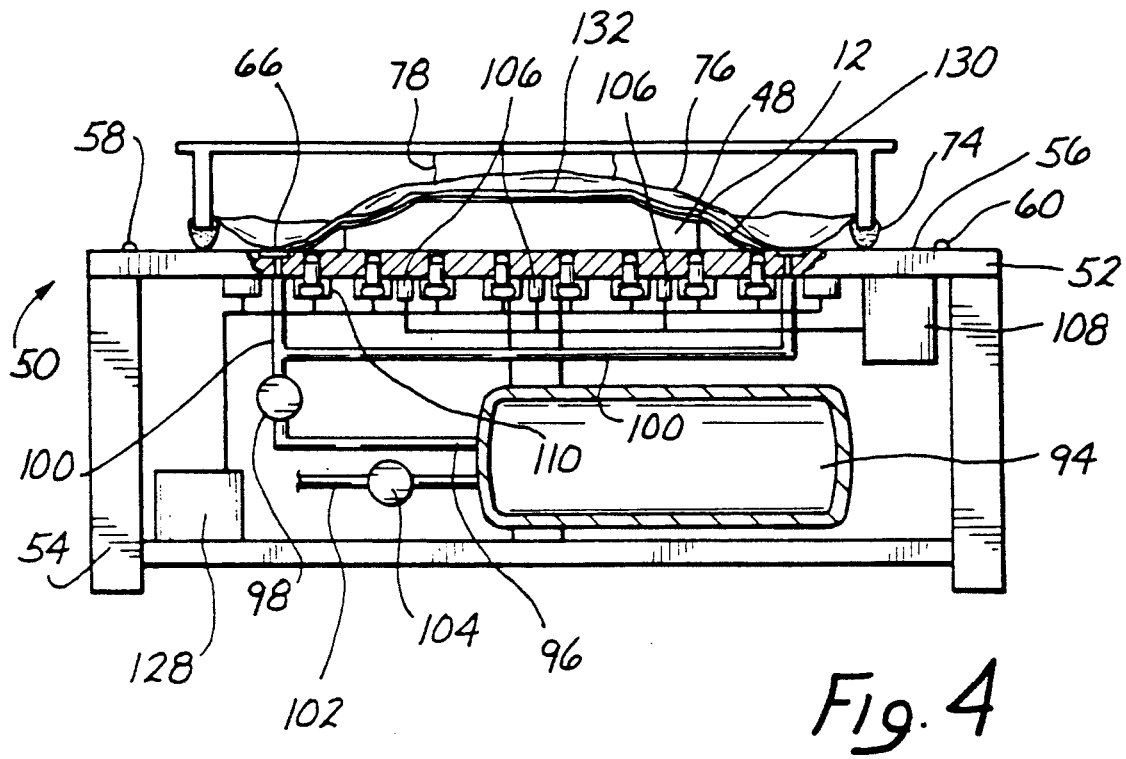
FIG. 4 is an elevational view in partial section of the work station component of FIG. 3.

Located on the front of the work table 50 is a control unit 92. Located below the work table 50 is a vacuum reservoir 94. As is seen in FIG. 4 the vacuum reservoir 94 is connected via vacuum line 96 to vacuum valve 98 and from vacuum valve 98 via line 100 to the vacuum ports 66 located in the working surface 56 of the work table 50. A further vacuum line 102 feeds a control valve 104 for creating a vacuum or low pressure environment within the vacuum reservoir 94.

As seen in FIG. 4, heating blankets, collectively identified by the numeral 106, are located on the bottom of the work table 50 and are connected to and controlled by heater controller 108. In illustrating the heating blankets 106, they are shown in a representational nature only in FIG. 4. Other heating means could be utilized to heat the platen 52 of the work table 50. Additionally, insulators could be provided in association with heaters 106 to prevent heat loss from the underneath side of the platen 52. Generally in operation the heat controller 108 would be switched on and would maintain the platen 52 of the work table 50 at a preset temperature during a work shift to allow for maintaining of tools at a preset desired temperature when they are located on the work surface 56.

Figure 5:
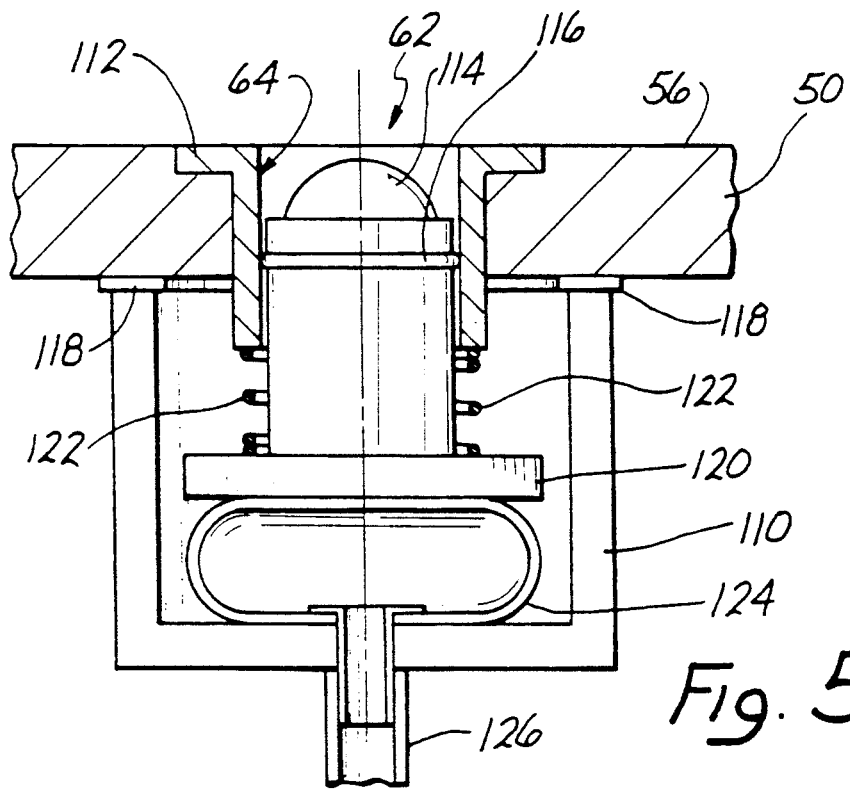
FIG. 5 is a side elevational view in partial section of one of the retractable rollers utilized on the work station of the invention.

Further, located below the work table 50 are a plurality of chambers, collectively identified by the numeral 110. These chambers are shown in greater detail in FIG. 5. Shown in FIG. 5 is the platen 52 and one of the caged ball rollers 62. The caged ball roller 62 fits within one of the openings 64 that extend through the working surface 56 into the platen 52. A bushing 112 positioned in the platen 52 forms the opening 64. The caged ball roller 62 is free to slide in the bushing 112 such that the level of its roller ball 114 is raised and lowered. In one embodiment of the invention an 0-ring 116 is utilized to seal the cage of the caged ball roller 62 to the opening 64 in the bushing 112. In a further embodiment of the invention a seal 118 is utilized to seal the entirety of the chamber 110 to the underside of the table 50. In this embodiment the 0-ring 116 need not be used and the tolerances between the caged ball roller 62 and the bushing 112 can be increased.

The caged ball roller 62 rests upon a lifting plate 120. A spring 122 is positioned between the lifting plate 120 and the bushing 112. An inflatable bladder 124 is located within the chamber 110 below the lifting plate 120. An air line 126 from a controller 128 connects to the bladder 124.

The caged ball roller 62 is raised in the bushing 112 by inflating the bladder 124. Inflation of the bladder 124 presses against lifting plate 120 which in turn lifts the caged ball roller 62 and positions the roller ball 114 above the plane of the surface 56. This simultaneously compresses the spring 122. When gas pressure in the bladder 124 is released, the tension in the spring 122 as well as force imparted to the roller ball 114 of the caged ball roller 62 by a tool that may be located on the roller ball 114 depresses the caged ball roller 62 downward within the bushing 112 to a position wherein the apex of the roller ball 114 is below the working surface 56.

It is preferred to use compressed gas and the inflatable bladder 124 to raise the caged ball roller 62 other than hydraulic or mechanical means since hydraulics inevitably require hydraulic fluid which can leak and mechanical means require lubrication that can become displaced. Hydraulic fluids and lubrication oils and greases are items to inherently be avoided in working with composite parts since they can contaminate the surface of the prepreg plies. Such contamination leads to defects of the composite part formed from the contaminated prepregs.

Referring now to FIG. 4, the tool 48 of FIG. 3 has been moved into position on the work table 50 and a series of prepreg plies 130 have been laid onto the tool 48 by a technician or operator of the device. A breather cloth 132 is next laid over the top of the plies 130. The diaphragm frame 72 is brought down over the combination of the tool, the plies 130 laid up thereon and the breather cloth 122. Prior to doing so, however, the vacuum reservoir 94 has been evacuated through the vacuum line 102 under the control of the valve 104.

With the diaphragm 76 placed over the tool, prepreg plies and breather cloth, the valve 98 is then opened allowing for exhaustion of air between the diaphragm 76 and the working surface 56. This removes any air from between the individual plies 130 and consolidates them under the pressure difference between atmospheric pressure and the evacuated pressure between the diaphragm 76 and the working surface 56. Such evacuation pressure is maintained by the seal 74 against the working surface 56. After consolidation the vacuum is released and the diaphragm frame 72 raised. The tool having the consolidated plies of the composite part is then raised by inflating the rubber inflatable bladders 124 within the chambers 110 to raise the caged ball rollers 62 to an elevated position. This raises the tool above the surface 56 allowing for rolling of the tool 56 to the dispatch table 80 at the dispatch station 16.

During lay up of the plies on the tool, vacuum can be slowly created in the reservoir 94 and then essentially instantaneously transferred to the vacuum ports 66 for rapid consolidation of the plies on the tool 48. If a vacuum line was directly fled to the vacuum ports 66 consolidation would be slow as a vacuum was slowly created between the diaphragm 76 and the working surface 56. Use of the vacuum reservoir 94 speeds up the consolidation process by pre-creating a vacuum in the reservoir 74 and then opening of a vacuum line between the reservoir 94 and the area between the diaphragm 76 and the working surface 56.

In a process of the invention the tool can be preheated prior to location of the tool at the tool delivery station 12. The rollers or caged ball rollers 62 at the work station 14 are then raised allowing for rolling of the tool to the work station 14. The caged ball rollers 62 are then retracted to firmly position the tool on the working surface of the work station 14. Plies are laid up on the tool as required followed by placement of a release film and a glass cloth on the plies. The diaphragm is then brought down onto the ply bearing tool and vacuum is applied to the diaphragm to consolidate the plies on the tool. After consolidation the diaphragm frame is raised, the tool is first raised from the working surface at the work station 14. Then the tool having the consolidated plies thereon is moved to the dispatch station 16 for further processing in forming a composite part.

In an alternate embodiment of the invention (not illustrated in the figures) the frame 72 is not hinged to the work table 50 but is suspended above the work table 50 by an appropriate mechanical or hydraulic system. The suspended frame is lowered and raised towards and upwards from the work table by the mechanical or hydraulic system under the control of an operator of the lay up assembly line.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes that come within meaning and range of equivalency of the claims are therefore intended to be embraced therein.

What is claimed is:

1. A debulking work station for composites comprising,
   a work table having an upper support surface and a plurality of spaced openings therein;
   a plurality of caged rollers each disposed for movement within one of said plurality of openings;
   means for retracting and elevating said rollers between a lowered position in which said rollers are retracted beneath said support surface and an elevated position at which said rollers extend above said support surface for lifting and supporting a tool for movement across a workpiece transfer surface defined by said elevated rollers;
   seal means operatively connected between each of said caged rollers and said respective opening for maintaining vacuum tight seal therebetween throughout the range of motion of said rollers between said retracted and elevated positions; and
   debulking means including a diaphragm and seal for establishing, with said work table, a vacuum tight debulking chamber over said support surface and rollers.

2. A work station as in claim 1 wherein:
   said debulking means includes a frame means, a diaphragm means and a pressure differential means;
   said frame means for supporting said diaphragm means, said frame means movably mounted with respect to said working surface to move towards and away from said working surface;
   said diaphragm means for retaining a pressure differential to debulk composite materials; and
   said pressure differential means for creating a pressure differential across said diaphragm means.

3. A work station as in claim 2, wherein:
   said diaphram means includes a seal means for sealing said diaphragm means to said working surface; and
   said pressure differential means includes a vacuum means for creating a vacuum between said working surface and said diaphragm means when said diaphragm is sealed to said working surface.

4. A work station as in claim 3 wherein:
   said vacuum means including a vacuum reservoir means for isolating a volume of space having a low pressure therein; and
   said vacuum means further includes a fluid passageway means for connecting said vacuum reservoir means to said area between said working surface and said diaphragm means when said diaphragm means is sealed to said working surface.

5. A work station as in claim 1 further including:
   heating means operatively associated with said working surface for heating said working surface.

6. A work station of claim 1 wherein:
   said retracting and elevating means includes a bladder means for expanding when filled with fluid, said bladder means operatively associated with said rollers for moving said rollers from said lowered position to said elevated position.

7. A work station of claim 6 wherein:
   said retracting and elevating means includes spring means for biasing said rollers to said lowered position.

8. A work station of claim 1 including:
   at least one chamber operatively connected to the under side of said surface and surrounding said openings in said surface;
   a fluid inflatable bladder located in said chamber between said chamber and said plurality of rollers; and
   means for inflating and deflating said bladder with a fluid.

9. A work station of claim 8 wherein:
   said rollers are movably mounted in said openings in said surface in operative association with said bladder so as to be moved in said openings by said bladder.

10. A work station of claim 9 further including:
    a lifting plate positioned between said bladder and said caged roller; and
    at least one biasing spring extending between said surface and said lifting plate for biasing said lifting plate towards said surface.

11. An assembly line for layup and debulking of composite structures comprising,
    a vacuum operated work station including
    a work table having an upper support surface and a plurality of spaced openings therein;
    a plurality of caged rollers each disposed for movement within one of said plurality of openings;
    means for retracting and elevating said rollers between a lowered position in which said rollers are retracted beneath said support surface and an elevated position at which said rollers extend above said support surface for lifting and supporting;
    a workpiece for movement across said rollers;

seal means operatively connected between each of said caged rollers and said respective opening or maintaining vacuum tight seal therebetween throughout the range of motion of said rollers between said retracted and elevated positions;

debulking means including a diaphragm and seal for establishing a vacuum tight debulking chamber over said support surface and rollers;

a delivery station positioned on one side of said work station and including a plurality of rollers having upper apexes defining a delivery support surface;

a dispatch station positioned on another side of said work station and including a plurality of roller means having species defining a dispatch support surface;

said delivery and dispatch support surfaces being continuous with said work station transfer surface.

12. A assembly line as in claim 11 wherein:

said debulking means includes a frame means, a diaphragm means and a pressure differential means;

said frame means for supporting said diaphragm means, said frame means movably mounted with respect to said working surface to move towards and away from said working surface;

said diaphragm means for retaining a pressure differential to debulk composite materials; and said pressure differential means for creating a pressure differential across said diaphragm means.

13. An assembly line as in claim 12 wherein:

said diaphram means includes a seal means for sealing said diaphragm means to said working surface; and said pressure differential means includes a vacuum means for creating a vacuum between said working surface and said diaphram means when said diaphragm is sealed to said working surface.

14. An assembly line as in claim 13 wherein:

said vacuum means including a vacuum reservoir means for isolating a volume of space having a low pressure therein; and said vacuum means further includes a fluid passageway means for connecting said vacuum reservoir means to said area between said working surface and said diaphragm means when said diaphragm means is sealed to said working surface.

15. An assembly line as in claim 11 further including:

heating means operatively associated with said working surface for heating said working surface.

16. An assembly as in claim 11 wherein:

said retracting and elevating means includes a bladder means for expanding when filled with fluid, said bladder means operatively associated with said rollers for moving said rollers from said lowered position to said elevated position.

17. A assembly line as in claim 16 wherein:

said retracting and elevating means includes spring means for biasing said rollers to said lowered position.

18. An assembly line as in claim 11 including:

at least one chamber operatively connected to the under side of said surface and surrounding said openings in said surface;

a fluid inflatable bladder located in said chamber between said chamber and said plurality of rollers; and means for inflating and deflating said bladder with a fluid.

19. An assembly line as in claim 18 wherein:

said rollers are movably mounted in said openings in said surface in operative association with said bladder so as to be moved in said openings by said bladder.

20. An assembly line as in claim 19 further including:

a lifting plate positioned between said bladder and said caged roller; and at least one biasing spring extending between said surface and said lifting plate biasing said lifting plate towards said surface.

21. A process of laying up and debulking composite materials on a tool comprising:

selecting a work station to include a working surface and a plurality of retractable rollers positioned in openings through the work surface;

providing each of said rollers with a vacuum tight seal to each said opening;

further selecting said work station to have a vacuum port in said working surface and a means for generating a vacuum at said vacuum port;

locating a delivery station having rollers thereon adjacent to said work station:

locating a frame having a flexible diaphragm fixed thereon in association with said work station;

positioning a lay up tool on said delivery station;

elevating said work station rollers such that at least a portion of said roller extends above said working surface;

moving said tool across said delivery station rollers to said work station rollers and positioning said tool onto said work station;

depressing said work station rollers below the plane of said working surface to position said tool on said working surface;

positioning layers of a composite material on said tool;

moving said frame with respect to said working surface to engage said diaphragm against said composite material on said tool and said working surface;

drawing vacuum at said vacuum port to debulk said composite material on said tool;

releasing said vacuum and moving said frame and said diaphragm away from said composite on said tool;

elevating said work station rollers; and moving said tool from said work station.

22. The process of claim 21 further including:

heating said work station working surface.

23. The process of claim 21 further including:

locating a vacuum reservoir in association with said work station;

creating a vacuum in said vacuum reservoir; and after engaging said diaphragm with said working surface and said composite material on said tool, connecting said vacuum reservoir to said vacuum port to evacuate the space between said diaphragm and said working surface.

* * * * *